United States Patent
Junela et al.

(10) Patent No.: US 8,406,762 B2
(45) Date of Patent: Mar. 26, 2013

(54) SYSTEM AND METHOD OF CONTROLLING REGISTRATION ON A MULTI-TECHNOLOGY HANDSET

(75) Inventors: Anupam Junela, San Diego, CA (US); Chinmay Bajpai, HSR Layout (IN)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/470,988

(22) Filed: May 14, 2012

(65) Prior Publication Data
US 2012/0225654 A1    Sep. 6, 2012

Related U.S. Application Data

(63) Continuation of application No. 11/766,649, filed on Jun. 21, 2007, now Pat. No. 8,180,350.

(51) Int. Cl.
H04W 4/00 (2009.01)
H04W 36/00 (2009.01)

(52) U.S. Cl. ............... 455/435.2; 455/436; 455/442; 370/331

(58) Field of Classification Search ............... 455/435.1, 455/442; 370/331
See application file for complete search history.

(56) References Cited

U.S. PATENT DOCUMENTS

| | | | |
|---|---|---|---|
| 7,502,615 B2 * | 3/2009 | Wilhoite et al. | 455/442 |
| 2004/0203773 A1 * | 10/2004 | Balasubramanian et al. | 455/435.1 |
| 2006/0116127 A1 | 6/2006 | Wihoite et al. | |
| 2007/0086383 A1 | 4/2007 | Watanabe et al. | |

* cited by examiner

*Primary Examiner* — Kent Chang
*Assistant Examiner* — Kuo Woo

(57) ABSTRACT

Embodiments of the present invention are directed to controlling registration on a multi-technology handset. By controlling registration on a multi-technology handset, efficient handoffs between different technologies can occur. In one embodiment, the multi-technology handset operates using a first technology and at least one second technology. The second technology can be wireless fidelity (WiFi) or worldwide interoperability for microwave access (WiMAX), for example. The multi-technology handset includes at least a dual mode controller (DMC), a first technology controller, a second technology controller, as well as radios for the first and second technologies.

15 Claims, 13 Drawing Sheets

SYSTEM AND METHOD OF CONTROLLING REGISTRATION ON A MULTI-TECHNOLOGY HANDSET

RELATED APPLICATIONS

This application is a continuation application of U.S. patent application Ser. No. 11/766,649, filed Jun. 21, 2007, and granted as U.S. Pat. No. 8,180,350 on May 15, 2012.

FIELD OF THE INVENTION

The present invention is directed to cellular telecommunications using a multi-technology handset for controlling registration.

BACKGROUND

Code division multiple access (CDMA) is a form of multiplexing and a method of multiple access that divides up a radio channel not by time (as in time division multiple access), nor by frequency (as in frequency-division multiple access), but instead by using different pseudo-random code sequences for each user. CDMA is a form of "spread-spectrum" signaling, since the modulated coded signal has a much higher bandwidth than the data being communicated.

In cellular telecommunications, the term handoff refers to the process of transferring an ongoing call or data session from one channel connected to the core network to another. In telecommunications there may be different reasons why a handoff might be conducted. For example, the handset might be moving away from the area covered by one base station and entering the area covered by another base station. In such a case, the call might be transferred to the second base station in order to avoid call termination when the handset gets outside the range of the first base station.

Multi-technology handsets can also perform a handoff, but the handoff can be between different technologies. This type of handoff becomes difficult, however, in a handset that uses CDMA as one of the technologies because the registration process in CDMA is very closely coupled with the powering on and off of a CDMA radio in the handset and acquiring a CDMA network.

A CDMA only handset performs registration (e.g., CDMA power-up registration) on acquiring an acceptable CDMA network and overhead settings. The CDMA only handset will continue to perform periodic registrations (e.g., timer-based, location-based) based on the settings indicated by CDMA overhead messages. The CDMA only handset will perform de-registration (e.g., CDMA power-down registration) when the CDMA radio is turned off. This process works adequately on CDMA only handsets.

In a multi-technology handset where CDMA is one of the technologies, the introduction of a new technology becomes a handicap because of the close coupling between the CDMA registration process and the powering on and off of a CDMA radio. For example, it would be highly undesirable and user-unfriendly to have to power off the handset in order to perform a handoff away from CDMA to a second technology. A handset that supports multiple technologies should be able to seamlessly handoff from CDMA to another technology and vice-versa but if the handset must be powered on and off each time this happens, such a scheme becomes impractical.

SUMMARY

Embodiments of the present invention are directed to controlling CDMA registration on a multi-technology handset. By controlling CDMA registration on a multi-technology handset there can be a de-coupling of the CDMA registration process and the powering on and off of a CDMA radio. This makes it possible for the handset to perform efficient handoffs between different technologies.

In one embodiment, the multi-technology handset operates using CDMA and at least one second technology. The second technology can be wireless fidelity (WiFi) or worldwide interoperability for microwave access (WiMAX), for example. The multi-technology handset includes at least a dual mode controller (DMC), a CDMA controller, a second technology controller, as well as radios for the CDMA and the second technology to connect to their respective networks.

The DMC controls the registration and de-registration processes for the CDMA and the second technology networks by issuing instructions or commands to the CDMA controller and the second technology controller. In this manner, a handoff logic module in the handset is capable of choosing the most appropriate technology without regard to previous limitations regarding CDMA registration (e.g., the close coupling of the CDMA registration process with the powering on or off of the COMA radio).

In one embodiment, the handoff logic module takes into account criteria such as signal strength, signal to noise ratio, quality of service, dropped packets, battery use among technologies, and preference settings in addition to the mere availability of a technology to choose whether or not to perform a handoff. If the handoff logic module determines a handoff should take place from CDMA to the second technology, it causes the DMC to instruct the second technology controller to acquire the second technology network, instruct the second technology controller to register with or complete the communicative coupling with the second technology network, and instruct the CDMA controller to de-register from the CDMA network or break the communicative coupling with the CDMA network. If the handoff logic module determines a handoff should take place from the second technology to CDMA, it causes the DMC to instruct the CDMA controller to acquire the CDMA network, instruct the CDMA controller to register with or complete the communicative coupling with the CDMA network, and instruct the second technology controller to de-register from or break the communicative coupling with the second technology network.

In one embodiment, the instructions the DMC sends to the CDMA controller include a power-up registration command, an immediate power-up registration command, a power-down registration command, and an abort registration command. The CDMA controller also includes a number of flags. A flagging module in the DMC sets the flags in the CDMA controller in addition to sending the instructions. The setting of the flags in the CDMA controller causes the CDMA controller to transition from a first state to a second state.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for controlling code division multiple access (CDMA) registration on a multi-technology handset. For example, one method as disclosed herein allows for the multi-technology handset to handoff between CDMA and a second technology such as wireless fidelity (WiFi) or worldwide interoperability for microwave access (WiMAX).

After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
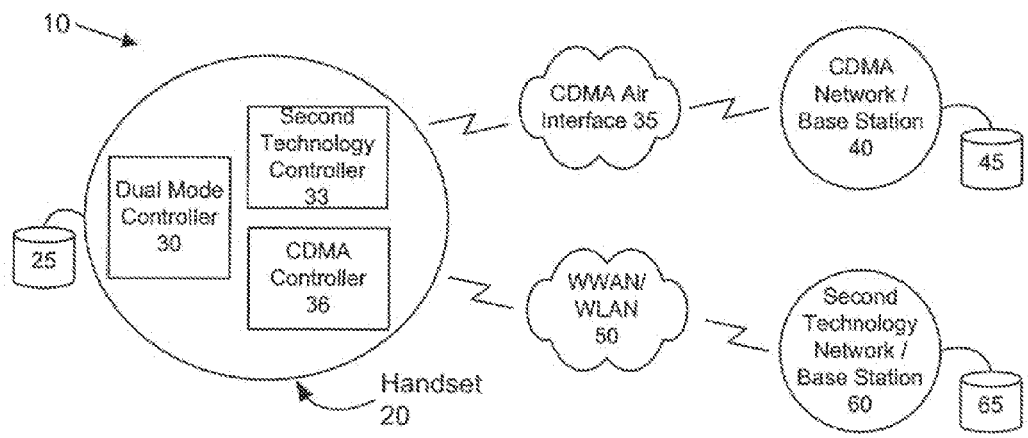
FIG. 1 is a network diagram illustrating an example multi-technology handset in communication over a CDMA network and a second technology network according to an embodiment of the present invention.

FIG. 1 is a network diagram illustrating an example multi-technology handset in communication over a CDMA network and a second technology network according to an embodiment of the present invention. In the illustrated embodiment, the system 10 comprises a multi-technology handset 20 (also referred to herein as a handset), a CDMA network 40, and a second technology network 60. The handset 20 and each of the networks 40 and 60 are configured with respective data storage areas 25, 45, and 65.

The handset 20 is capable of being communicatively coupled with both a CDMA air interface 35 and a wireless wide area network (WWAN) or a wireless local area network (WLAN) (second technology air interface) 50. The CDMA air interface 35 is configured for voice and data communications (e.g., with CDMA network 40) over a wide geographical area, for example using the CDMA communication scheme. The second technology air interface 50 is configured for voice and data communications (e.g., with second technology network 60) over a more limited geographical area, for example using one or more of the IEEE 802 communication standards such as 802.11 a/b/g or over a wide geographical area depending on the second technology. The CDMA air interface 35 or the second technology air interface 50 can also be communicatively coupled with a public or private network (not shown), which may include that particular aggregation of networks commonly known as the Internet.

The handset 20 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network such as the CDMA air interface 35 and the second technology air interface 50.

The handset 20 includes a dual mode controller (DMC) 30, a CDMA controller 36, and a second technology controller 33. The DMC 30 is configured to send commands or instructions to the CDMA controller 36 and the second technology controller 33 and to receive messages from them as well. The DMC 30 can generally cause the CDMA controller 36 to register or de-register with the CDMA network 40 and can cause the second technology controller 33 register or de-register with the second technology network 60.

The data storage areas 25, 45, and 65 can be any sort of internal or external memory device and may include both persistent and volatile memories. The function of the respective data storage areas 25, 45, and 65 is to maintain data for long-term storage and also to provide efficient and fast access to instructions for applications that are executed by the respective devices.

Figure 2:
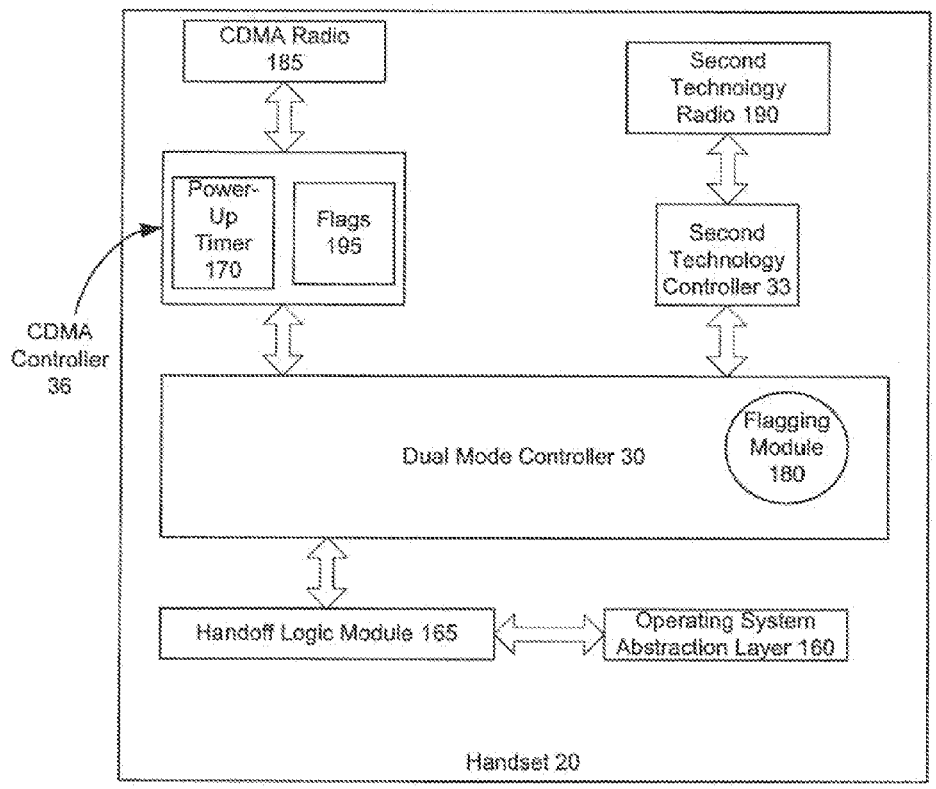
FIG. 2 is a block diagram illustrating an example multi-technology handset according to an embodiment of the present invention.

FIG. 2 is a block diagram illustrating an example multi-technology handset 20 according to an embodiment of the present invention. In the illustrated embodiment, the handset 20 comprises the CDMA controller 36, the second technology controller 33, the DMC 30, a CDMA radio 185, a second technology radio 190, a power-up registration timer 170, a handoff logic module 165, and an operating system abstraction layer ("OSAL") module 160. These various modules in the handset 20 can be implemented in software, hardware, or some combination of the two and are in communication with each other directly or indirectly through various inter-module interfaces.

The OSAL module 160 is configured to abstract the services of the operating system on the handset 20 so that third-party software modules can be more easily integrated. The power-up registration timer 170 is configured to time a pre-determined time period, such as 20 seconds. For example, when a handset acquires a CDMA network upon initialization, it may wait for the pre-determined time period before registering, as is common with CDMA systems.

The handoff logic module 165 can be a software module containing the logic or algorithms to properly determine whether conditions exist that require or make it desirable to perform a handoff from CDMA to the second technology or vice-versa. The handoff logic module 165 can take into account a number of criteria in order to choose whether or not to perform the handoff. The criteria can include, for example, signal strength, signal to noise ratio, quality of service, dropped packets, and preference settings in addition to the mere availability of a technology.

If the handoff logic module 165 determines that a handoff should take place from CDMA to the second technology, it causes the DMC 30 to instruct the second technology controller 33 to acquire and register with the second technology network 60 (i.e., to complete the communicative coupling with the second technology network 60) and to instruct the CDMA controller 36 to de-register from the CDMA network 40 (i.e., to break the communicative coupling with the CDMA network 40). This process includes the DMC 30 instructing the second technology controller 33 to use the second technology radio 190 to acquire the second technology network 60, to register on the second technology network 60, and to cause the CDMA controller 36 to de-register from the CDMA network 40.

If the handoff logic module 165 determines that a handoff should take place from the second technology to CDMA, it causes the DMC 30 to instruct the CDMA controller 33 to acquire and register on the CDMA network 40 (i.e., to complete the communicative coupling with the CDMA network 40) and to instruct the second technology controller 33 to de-register from the second technology network 60 (i.e., to break the communicative coupling with the second technology network 60). This process includes the DMC 30 instructing the CDMA controller 36 to use the CDMA radio 185 to acquire the CDMA network 40, to register on the CDMA network 40, and to cause the second technology controller 33 to de-register from the second technology network 60.

In one embodiment, the instructions the DMC 30 sends to the CDMA controller 36 include a power-up registration command, an immediate power-up registration command, a power-down registration command, and an abort registration command. The CDMA controller 36 also includes a number of flags 195. A flagging module 180 in the DMC 30 sets the flags 195 in the CDMA controller 36 in addition to sending the instructions. The setting of the flags 195 in the CDMA controller 36 causes the CDMA controller 36 to alter its behavior as will be described in further detail subsequently.

Figure 3:
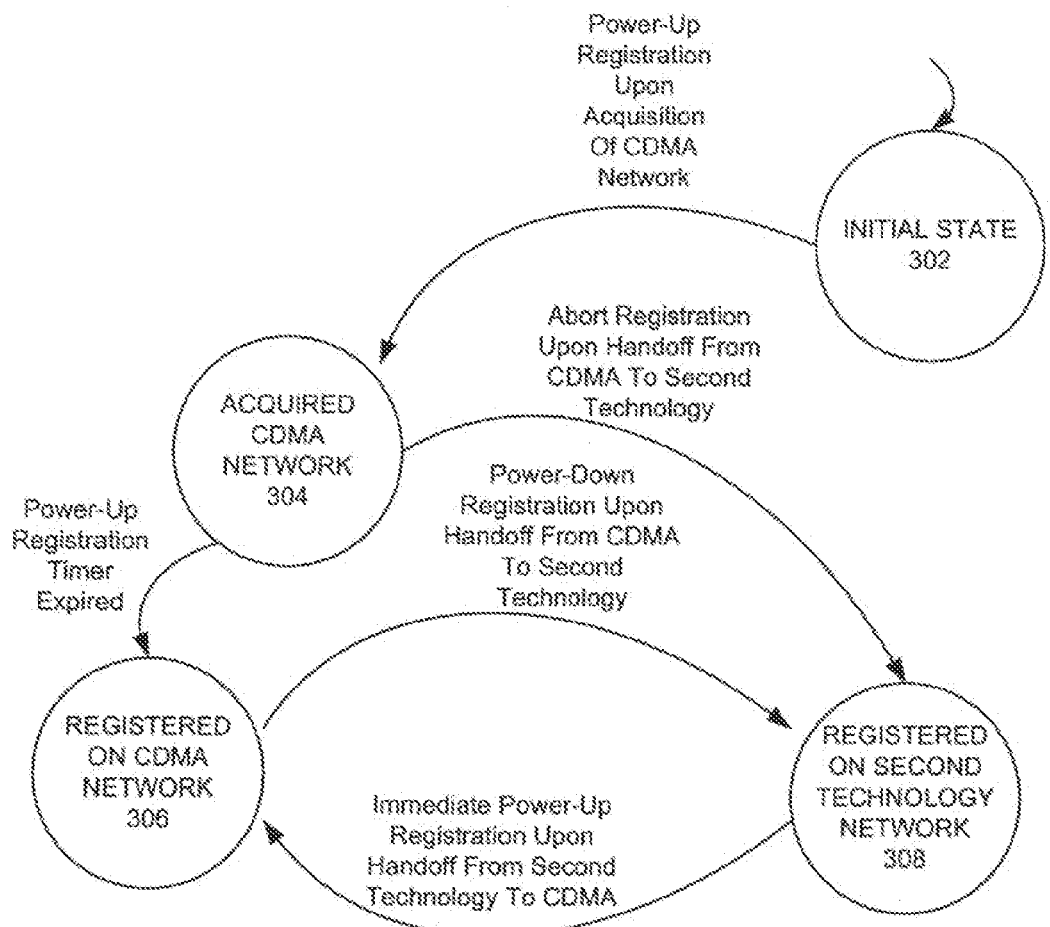
FIG. 3 is a state diagram illustrating a plurality of various states and transitions between states according to an embodiment of the present invention.

FIG. 3 is a state diagram illustrating a plurality of various states and transitions between states according to an embodiment of the present invention. Initially, the system 10 is in an initial state 302, such as when the user has first powered-up the handset 20 and is ready to acquire the CDMA network.

The power-up registration command occurs upon acquisition of the CDMA network 40 on a transition to an acquired CDMA network state 304. After acquiring the CDMA network, the handset 20 starts the internal power-up registration timer 170. If the internal power-up registration timer 170 expires, the system 10 transitions to the registered on the CDMA network state 306. From the state 304 an abort registration command can occur upon a handoff from CDMA to the second technology on a transition to a registered on the second technology network state 308 (i.e., before the power-up registration timer 170 expires). From the state 306, a power-down registration command can occur upon a handoff from CDMA to the second technology on the transition to the state 308. From the state 308, an immediate power-up registration command can occur upon a handoff from the second technology to CDMA on the transition to the state 306.

Figure 4A:
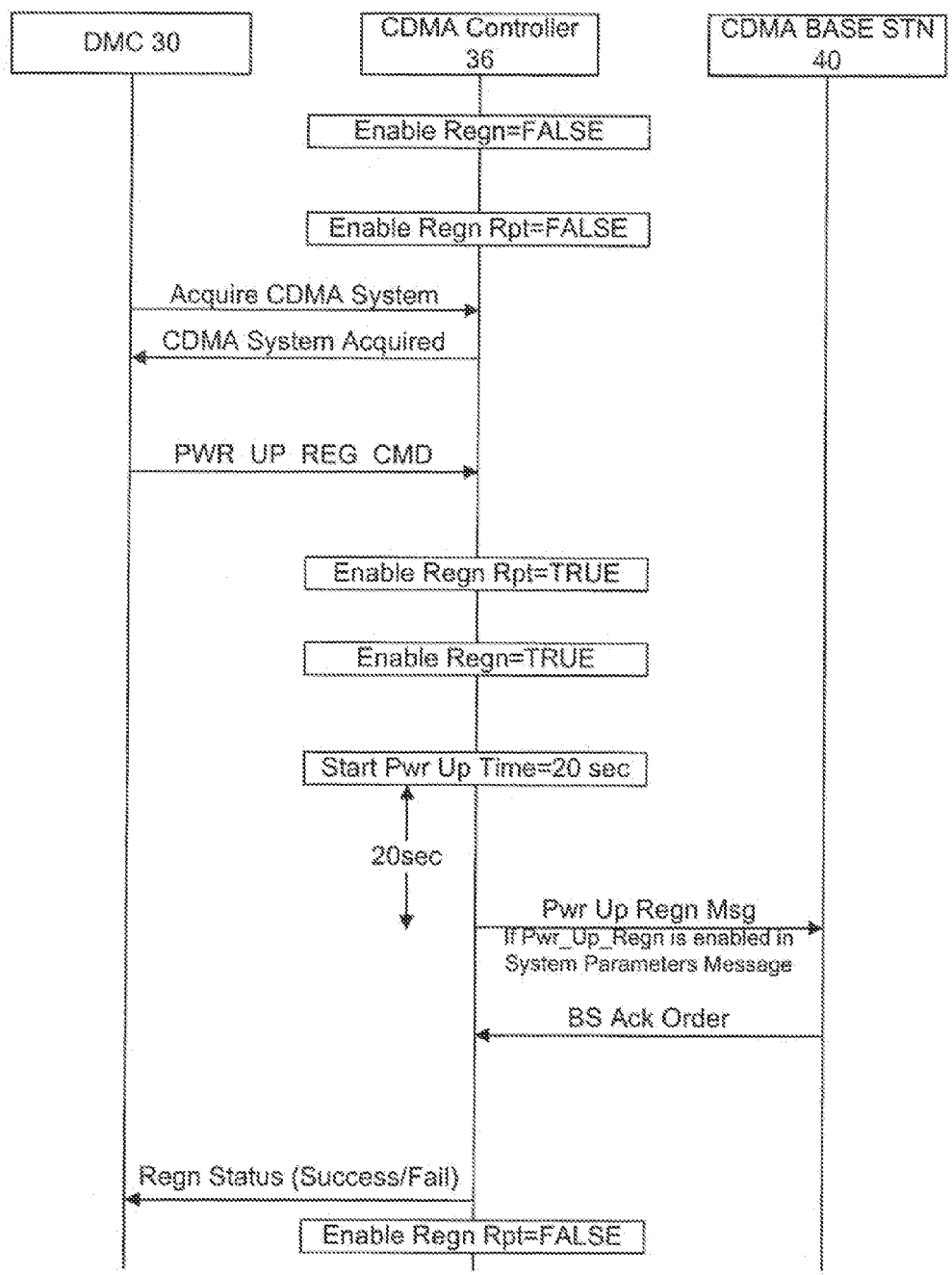
FIG. 4A is a communication flow diagram illustrating an example process that occurs in response to a command issued by a dual mode controller according to an embodiment of the present invention.

FIG. 4A is a communication flow diagram illustrating an example process that occurs in response to a command issued by the DMC according to an embodiment of the present invention. In the communication flow diagram of FIG. 4, the DMC 30 has issued a power-up registration command to the CDMA controller 36. The present communication flow can occur, for example in the initial state 302 of FIG. 3 to cause a transition to acquiring the CDMA network at state 304 to registering on the CDMA network at state 306. This may occur for example, at the initial state 302 (i.e., the DMC 30 is being initialized) when the handset 20 indicates that the mode preference is CDMA. This may also occur, for example, when the mode preference is the second technology and the CDMA network 40 has been successfully acquired.

The power-up registration command instructs the CDMA controller 36 to carry out the normal power-up registration on the COMA network 40 in the case where the handset 20 will not perform power-up registration earlier than 20 seconds from the moment the command was sent by the DMC 30 to the CDMA controller 36. This occurs, for example, on normal power-up of the device by the user provided power-up registration is indicated by the CDMA network 40 in a system parameters message.

In operation, the flagging module 180 sets two of the flags 195 in the CDMA controller 36 to false, enable registration (enable_regn) and enable registration report (enable_regn_rpt). Setting the enable_regn flag to false causes the CDMA controller 36 to not attempt to register with the CDMA network 40. Setting the enable_regn_rpt flag to false causes the CDMA controller 36 to not attempt to return a registration status message to the DMC 30 regarding the results of the attempted registration with the CDMA network 40. The DMC 30 then sends a command for the COMA controller 36 to acquire the CDMA network 40 and receives a response from the CDMA controller 36 when the CDMA network 40 is acquired. The DMC 30 then sends the power-up registration command and sets enable_regn and enable_regn_rpt to true.

The CDMA controller 36 starts a power-up timer and at the expiration of a pre-determined period (e.g., 20 seconds) the CDMA controller 36 sends a power-up registration message to the CDMA network 40. The CDMA network 40 sends an acknowledgement to the CDMA controller 36 and the CDMA controller 36 returns a registration status message to the DMC 30 as to whether the registration process was a success or a failure. Thereafter, the DMC 30 can set the enable_regn_rpt flag to false to prevent the CDMA controller 36 from flooding the DMC 30 with unnecessary messages. In another embodiment, the DMC 30 can set the enable_regn_rpt flag to false at any time to avoid the return of the registration status message to the DMC 30.

Figure 4B:
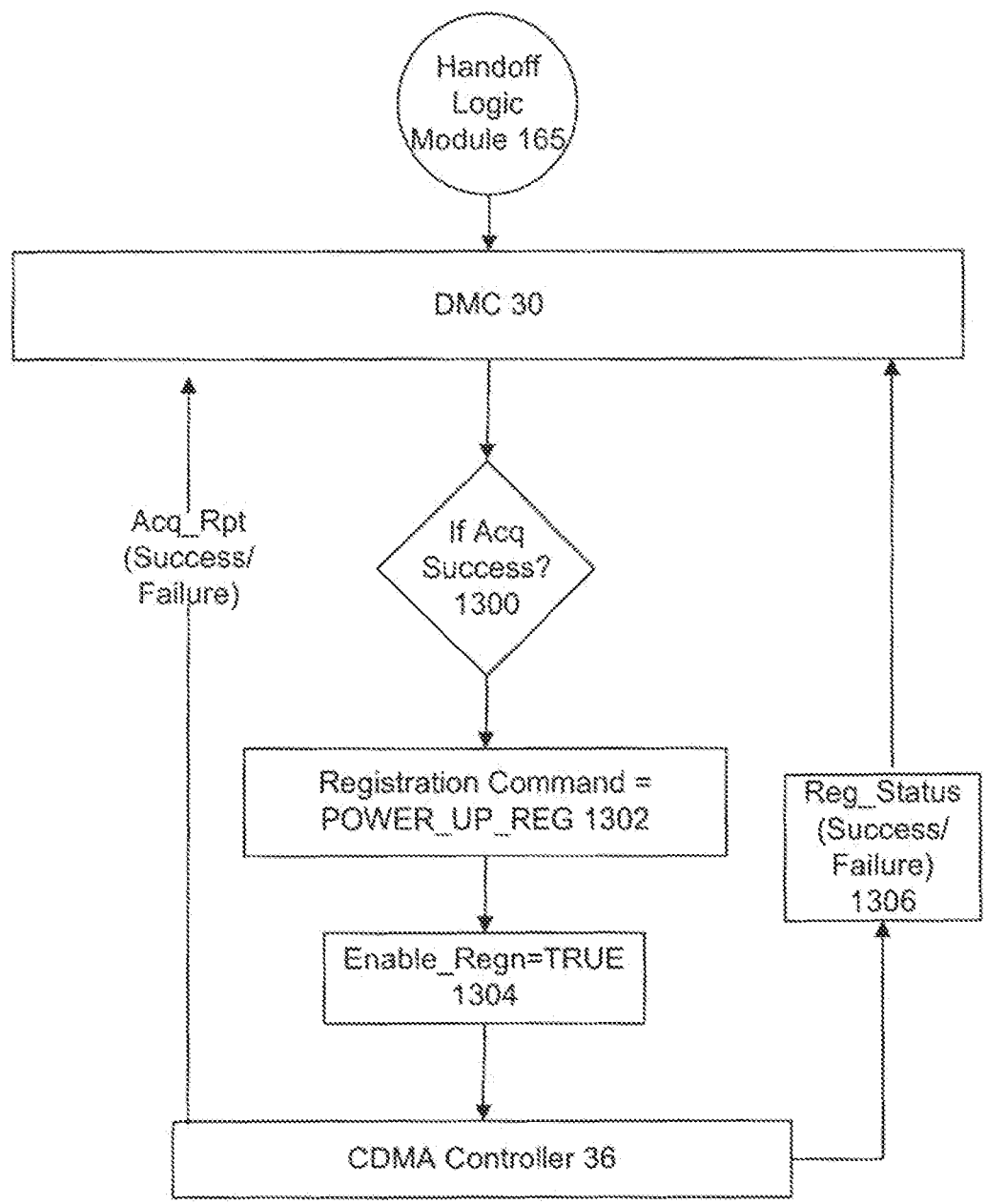
FIG. 4B is a flowchart illustrating a power-up registration process according to an embodiment of the present invention.

FIG. 4B is a flowchart illustrating a power-up registration process according to an embodiment of the present invention. The process of FIG. 4B occurs when the handset 20 is first powered up and the mode preference is CDMA or when the mode preference is the second technology and the CDMA network 40 has been successfully acquired.

In this scenario, if the acquisition of the CDMA network is successful at step 1300, the DMC 30 sends a power-up registration command at step 1302 to the CDMA controller 36. The flagging module 180 the enable registration (enable_regn) flag to true at step 1304. At block 1306, the DMC 30 receives a registration status from the CDMA controller 36 and the process ends.

Figure 5:
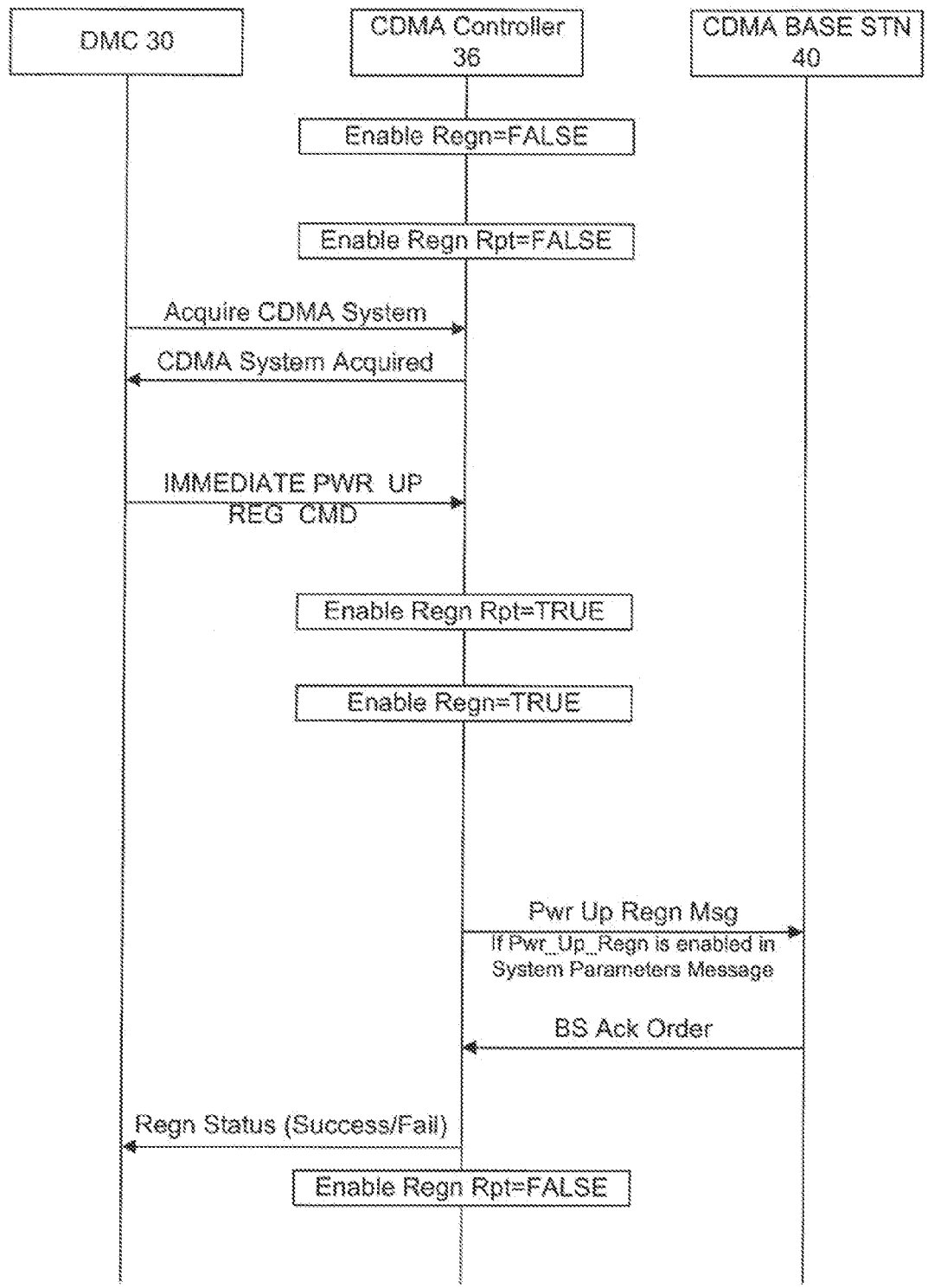
FIG. 5 is a communication flow diagram illustrating an example process that occurs in response to a command issued by a dual mode controller according to an embodiment of the present invention.

FIG. 5 is a communication flow diagram illustrating an example process that occurs in response to a command issued by the DMC according to an embodiment of the present invention. In the communication flow diagram of FIG. 5, the DMC 30 has issued an immediate power-up registration command to the CDMA controller 36. The present communication flow can occur, for example in the registered on a second technology network state 308 of FIG. 3 to cause a transition to a registered on a CDMA network state 306.

The immediate power-up registration command instructs the CDMA controller 36 to carry out the power-up registration immediately on the CDMA network 40 upon receiving the command from the DMC 30. This occurs, for example, when the handset 20 is currently connected to the second technology network 60 and the handoff logic module 165 indicates to the DMC 30 that it is currently desirable to perform a handoff to connect to the CDMA network 40 provided power-up registration is indicated by the CDMA network 40 in a system parameters message.

In operation, the flagging module 180 sets two of the flags 195 in the CDMA controller 36 to false, enable registration (enable_regn) and enable registration report (enable_regn_rpt). The DMC 30 then sends a command for the CDMA controller 36 to acquire the CDMA network 40 and receives a response from the CDMA controller 36 when the CDMA network 40 is acquired. The DMC 30 then sends the power-up registration command and sets enable_regn and enable_regn_rpt to true.

The CDMA controller 36 starts a power-up immediately by sending a power-up registration message to the CDMA network 40. The CDMA network 40 sends an acknowledgement to the CDMA controller 36 and the CDMA controller 36 returns a registration status message to the DMC 30 as to whether the registration process was a success or a failure. Thereafter, the DMC 30 can set the enable_regn_rpt flag to false to prevent the CDMA controller 36 from flooding the DMC 30 with unnecessary messages. In another embodiment, the DMC 30 can set the enable_regn_rpt flag to false at any time to avoid the return of the registration status message to the DMC 30.

Figure 6:
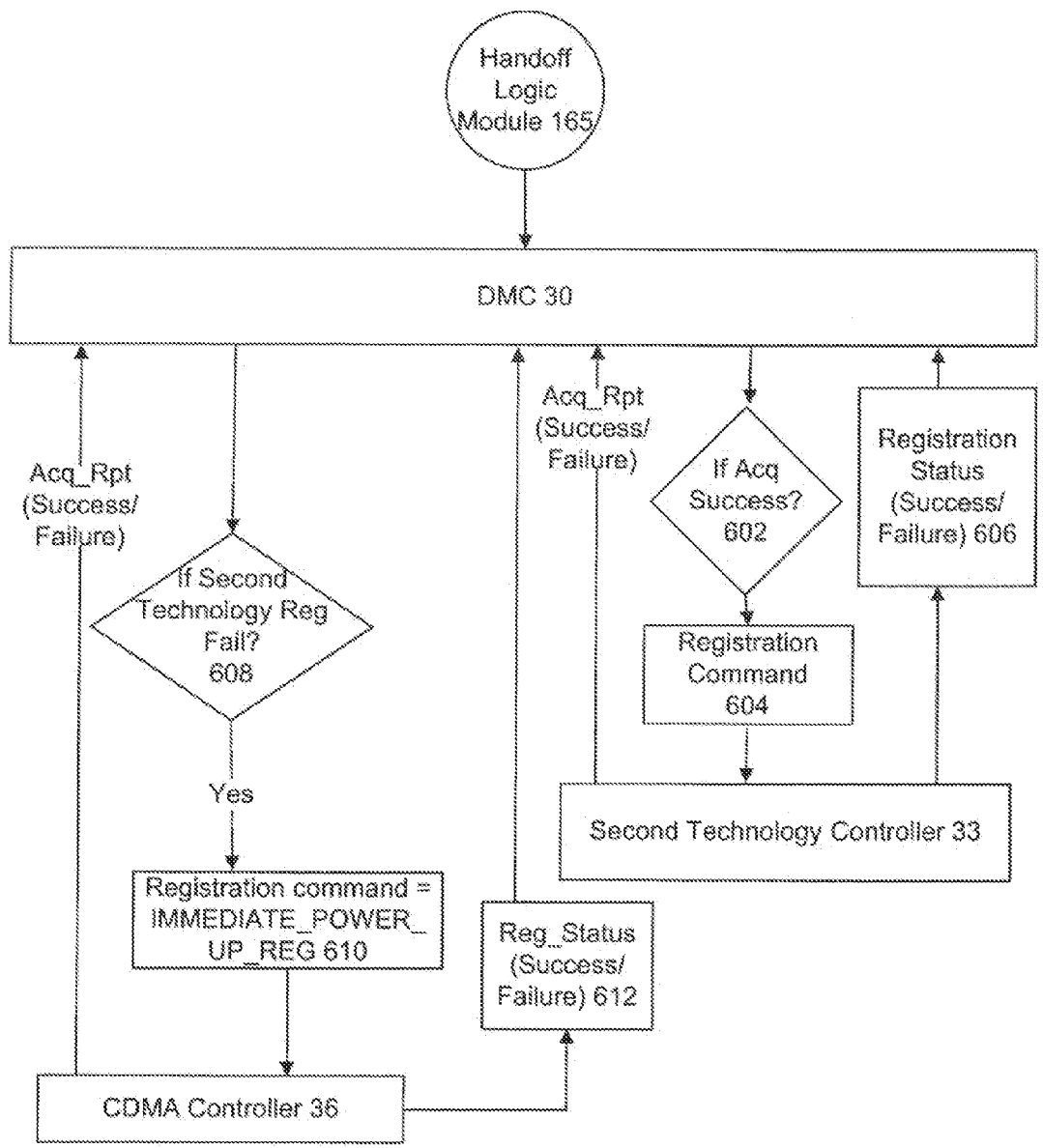
FIG. 6 is a flowchart illustrating an immediate power-up registration process according to an embodiment of the present invention.

FIG. 6 is a flowchart illustrating an immediate power-up registration process according to an embodiment of the present invention. The process of FIG. 6 occurs when the handoff logic module 165 determines that the handset 20 should connect to the second technology network 60 if the second technology network 60 is available, otherwise the handset should connect to the CDMA network 40.

In this scenario, the DMC 30 sends a registration command at step 604 to the second technology controller 33 if it determines at step 602 that the second technology controller 33 has acquired the second technology network 60. At block 606, the DMC 30 receives a registration status from the second technology controller 33. Either the second technology controller 33 registered on the second technology network 60 or it did not. If the registration is successful, the process is complete.

Otherwise, the DMC 30 sends an immediate power-up registration command at step 610 to the CDMA controller 36 if it determines at step 608 that the second technology controller 33 has not been able to register with the second technology network 60. At block 612, the DMC 30 receives a registration status from the CDMA controller 36 and the process ends.

Figure 7:
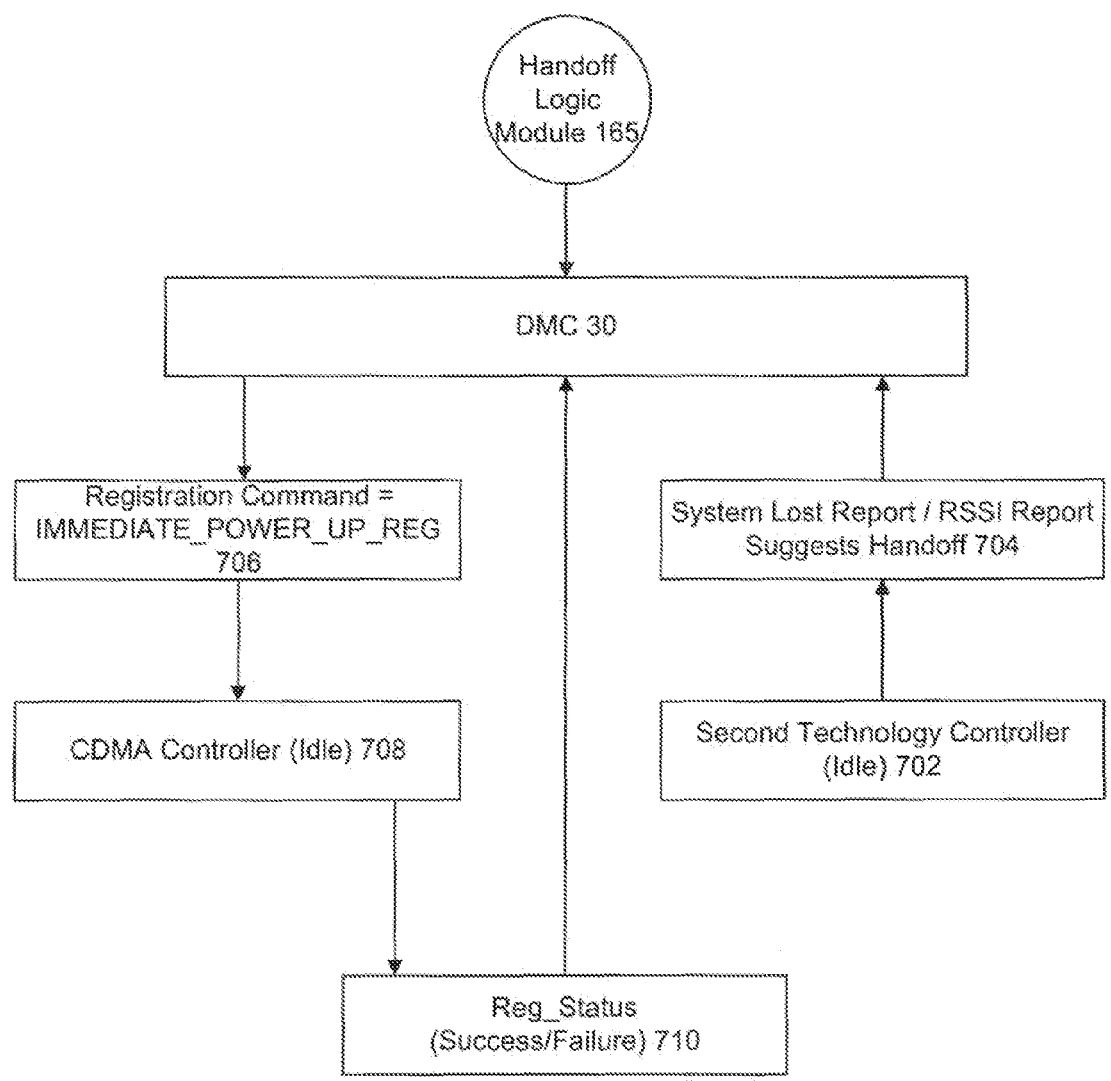
FIG. 7 is a flowchart illustrating an immediate power-up registration process according to an embodiment of the present invention.

FIG. 7 is a flowchart illustrating an immediate power-up registration process according to another embodiment of the present invention. The process of FIG. 7 occurs when the handoff logic module 165 determines that the handset 20 should connect to the CDMA network 40 if the CDMA network 40 is available. The process of FIG. 7 occurs when the handset is not currently on a call, but is currently registered to the second technology network 60 and an event occurs indicating that the handset should perform a handoff, such as the second technology network transmitting its signal with a power that is reduced to below a certain threshold. This type of handoff is referred to as an idle handoff or roaming.

In this scenario, the second technology controller 33 is idle at step 702 because the handset is not currently on a call. Furthermore, the handset 20 is registered to the second technology network 60. At step 704, an event occurs which indicates that the handset should perform a handoff. The event can be, for example, a system lost report, an RSSI report, etc. The event causes the handoff logic module 165 to instruct the DMC 30 to initiate a handoff to the CDMA network 40.

To that end, the DMC 30 sends an immediate power-up registration command at step 706 to the CDMA controller 36. The CDMA controller 36 receives the command at step 708. Thereafter, the DMC 30 receives a registration status from the CDMA controller 36 at step 710 and the process ends.

Figure 8:
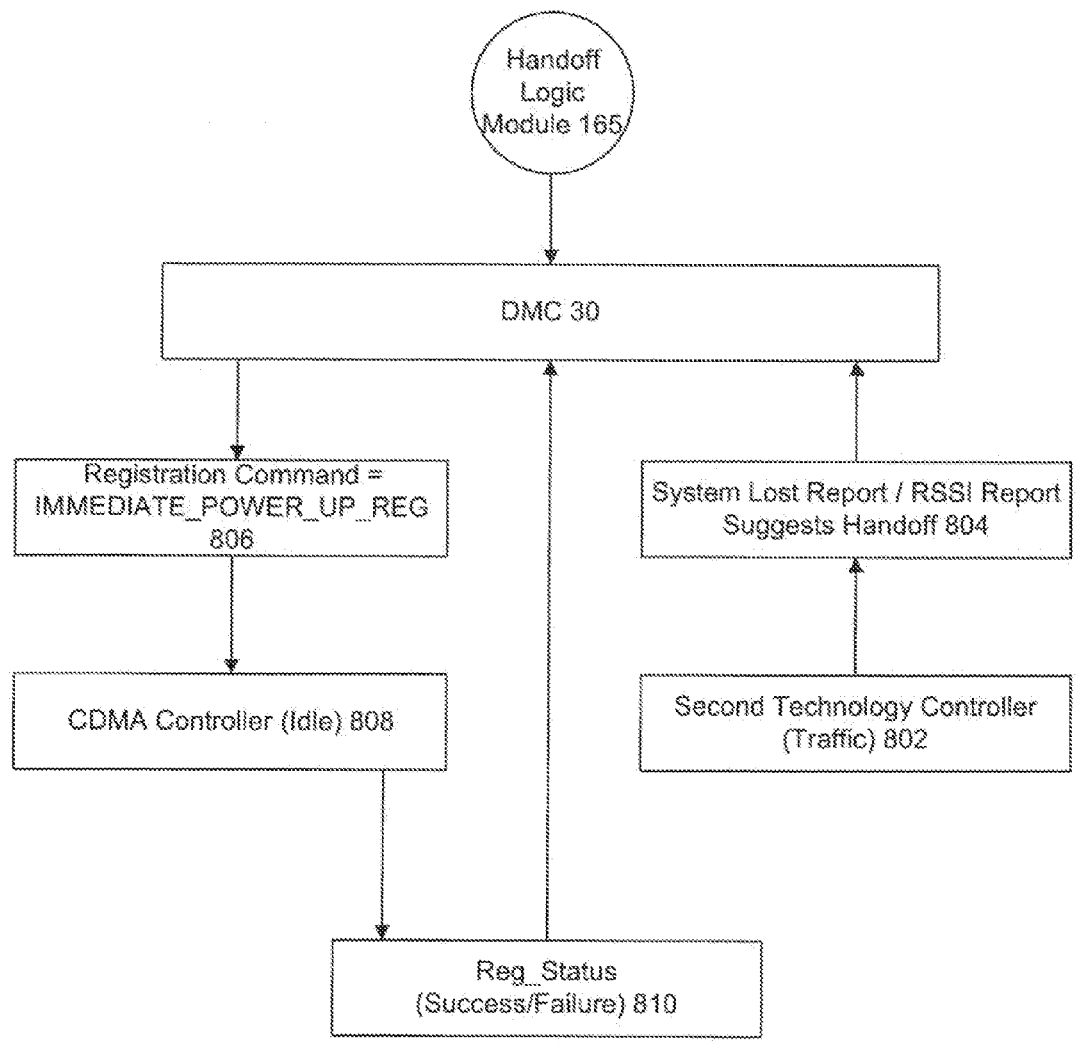
FIG. 8 is a flowchart illustrating an immediate power-up registration process according to an embodiment of the present invention.

FIG. 8 is a flowchart illustrating an immediate power-up registration process according to another embodiment of the present invention. The process of FIG. 8 occurs when the handoff logic module 165 determines that the handset 20 should connect to the CDMA network 40 if the CDMA network 40 is available. The process of FIG. 8 occurs when the handset is currently on a call and is currently registered to the second technology network 60 and an event occurs indicating that the handset should perform a handoff, such as the second technology network transmitting its signal with a power that is reduced to below a certain threshold. This type of handoff is referred to as an in-call handoff.

In this scenario, the second technology controller 33 is handling traffic at step 802 because the handset is currently on a call. Furthermore, the handset 20 is registered to the second technology network 60. At step 804, an event occurs which indicates that the handset should perform a handoff. The event can be, for example, a system lost report, an RSSI report, etc. The event causes the handoff logic module 165 to instruct the DMC 30 to initiate a handoff to the CDMA network 40.

To that end, the DMC 30 sends an immediate power-up registration command at step 806 to the CDMA controller 36. The CDMA controller 36 receives the command at step 808. Thereafter, the DMC 30 receives a registration status from the CDMA controller 36 at step 810 and the process ends.

Figure 9:
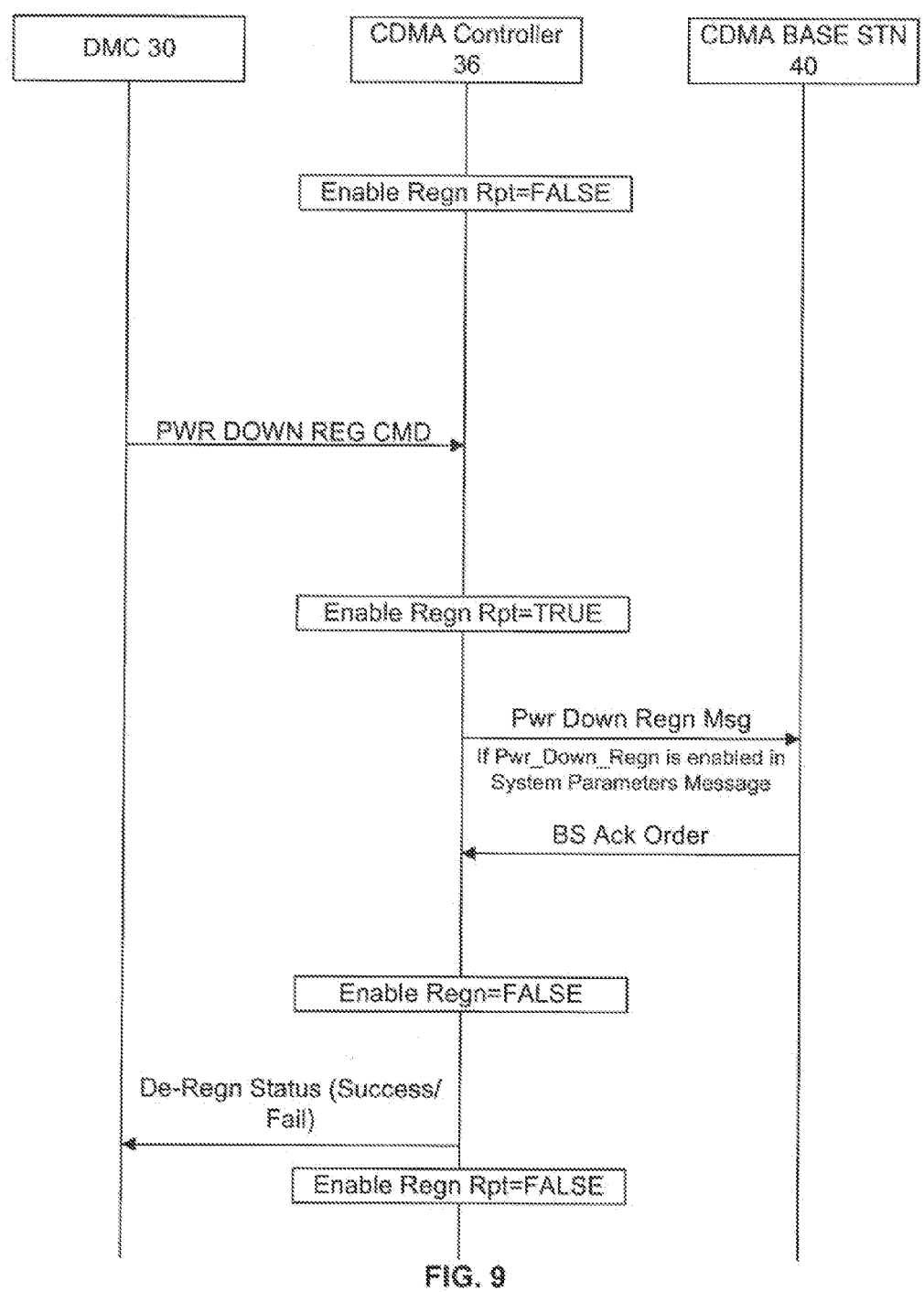
FIG. 9 is a communication flow diagram illustrating an example process that occurs in response to a command issued by a dual mode controller according to an embodiment of the present invention.

FIG. 9 is a communication flow diagram illustrating an example process that occurs in response to a command issued by the DMC according to an embodiment of the present invention. In the communication flow diagram of FIG. 9, the DMC 30 has issued a power-down registration command to the CDMA controller 36. The present communication flow can occur, for example in the registered on a CDMA network state 306 of FIG. 3 to cause a transition to a registered on a second technology network state 308.

The DMC 30 sends the power-down registration command to instruct the CDMA controller 36 to power-down when it is about to turn off the CDMA radio 185 or wants to disable registrations on the CDMA network 40. This occurs, for example, when the handset 20 is currently connected to the CDMA network 40 and the handoff logic module 165 indicates to the DMC 30 that it is currently desirable to perform a handoff to connect to the second technology network 60 provided power-down registration is indicated by the CDMA network 40 in a system parameters message.

In operation, the flagging module 180 sets enable_regn_rpt to false. The DMC 30 then sends the power-down registration command to the CDMA controller 36 and sets enable_regn_rpt to true.

The CDMA controller 36 starts a power-down by sending a power-down registration message to the CDMA network 40. The CDMA network 40 sends an acknowledgement to the CDMA controller 36. Thereafter, the flagging module 180 sets enable_regn to false and the CDMA controller 36 returns a registration status message to the DMC 30 as to whether the de-registration process was a success or a failure. The DMC 30 then can set the enable_regn_rpt flag to false to prevent the CDMA controller 36 from flooding the DMC 30 with unnecessary messages.

Figure 10:
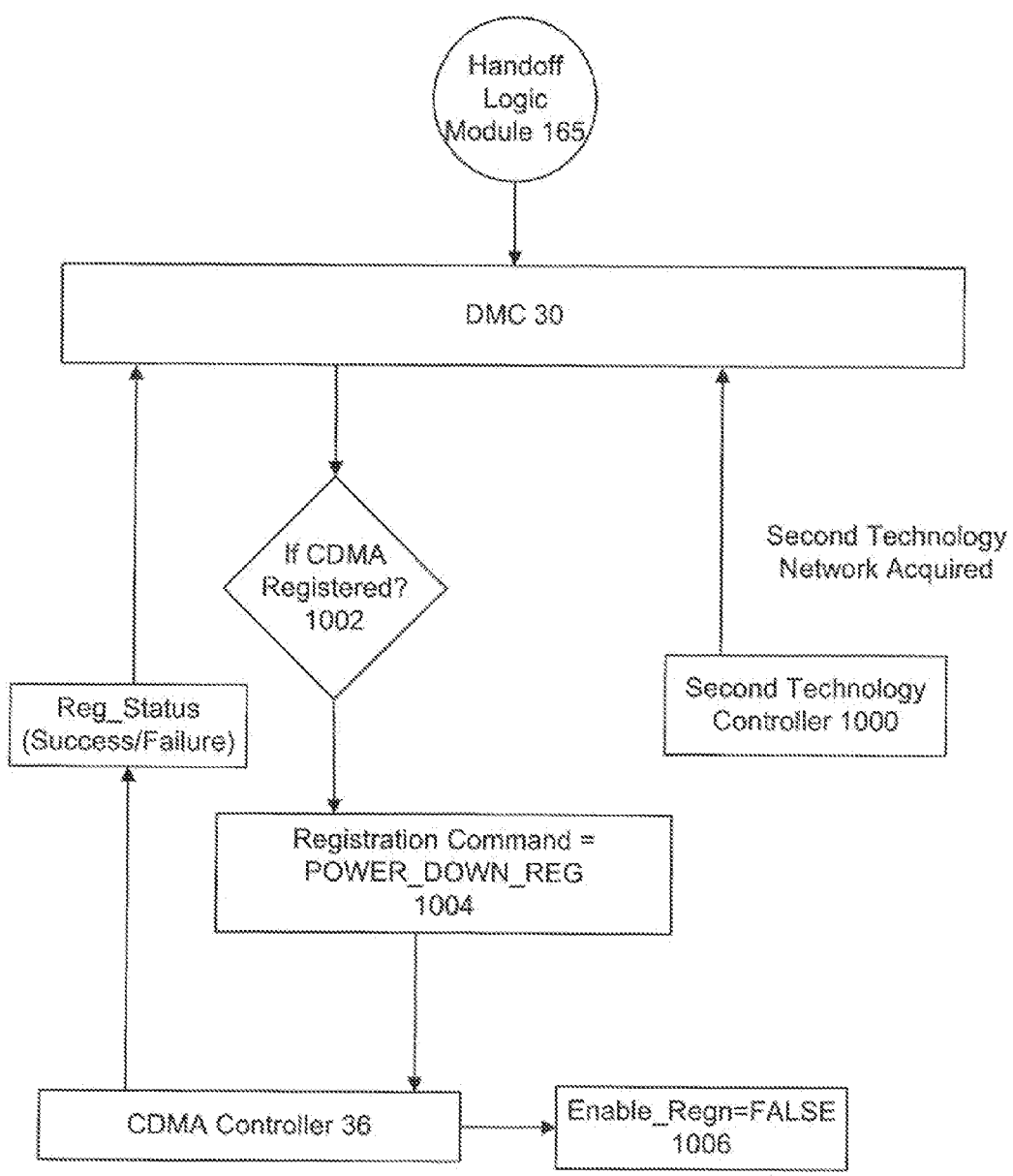
FIG. 10 is a flowchart illustrating a power-down registration process according to an embodiment of the present invention.

FIG. 10 is a flowchart illustrating a power-down registration process according to an embodiment of the present invention. The process of FIG. 10 occurs when the handoff logic module 165 determines that the handset 20 should connect to the second technology network 60. The process of FIG. 10 occurs in general by the handset 20 remaining on the CDMA network 40, acquiring the second technology network 60, then de-registering from the CDMA network 40.

In this scenario, the second technology controller 33 acquires the second technology network 60 at step 1000. At step 1002, the DMC 30 ensures that the handset 20 is registered with the CDMA network 40 and issues a power-down registration command at step 1004. The CDMA controller 36 reports the de-registration status to the DMC 30 and the DMC 30 sets the enable registration flag in the CDMA controller 36 to false at step 1006 to stop the CDMA controller 36 from attempting to register with the CDMA network 40.

Figure 11:
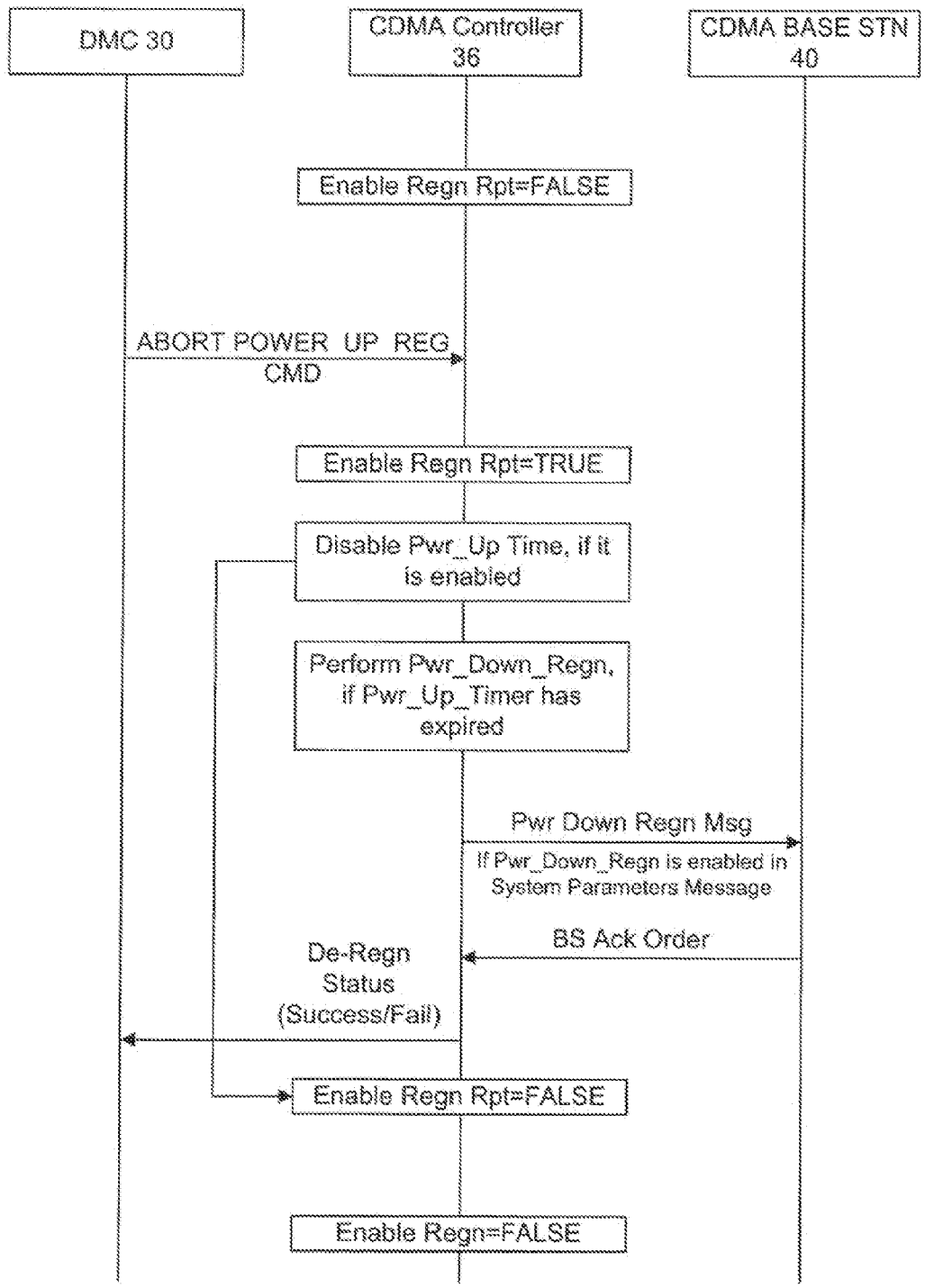
FIG. 11 is a communication flow diagram illustrating an example process that occurs in response to a command issued by a dual mode controller according to an embodiment of the present invention.

FIG. 11 is a communication flow diagram illustrating an example process that occurs in response to a command issued by the DMC according to an embodiment of the present invention. In the communication flow diagram of FIG. 11, the DMC 30 has issued an abort registration command to the COMA controller 36. The present communication flow can occur, for example in the acquired CDMA network state 304 of FIG. 3 after transitioning from the initial state 302, but before the power-up registration timer 170 expires to transition to the registered on a second technology network state 308. The purpose of the present communication flow is to give the DMC 30 the ability to abort a registration, which might have been initiated on the CDMA network 40 because of a previous command issued by DMC 30 to the CDMA controller 36.

When CDMA controller 36 receives this command from the DMC 30, it checks if the power-up registration timer 170 is activated for a pending power-up registration as a result of the command issued earlier by the DMC 30. In such a case, the power-up registration timer 170 is aborted; otherwise a power down registration is performed with respect to the CDMA network 40, if the same has been indicated, for example, by the CDMA network 40 in a system parameters message. The DMC 30 will also prevent the CDMA controller 36 from further registration attempts on the CDMA network 40 after receiving this command.

In operation, the DMC 30 sends the power-down registration command to instruct the CDMA controller 36 to abort a registration on the CDMA network 40, which was previously initiated. This occurs, for example, when the handset 20 is currently in the process of connecting to the CDMA network 40, for example, during power-up, but the handoff logic module 165 indicates to the DMC 30 that it is currently desirable to connect to the second technology network 60. In this case, the DMC 30 can cause the CDMA controller 36 to abort the registration process before the power-up timer in the CDMA controller 36 reaches the expiration of the pre-determined period (e.g., 20 seconds).

In operation, the flagging module 180 sets enable_regn_rpt to false. The DMC 30 then sends the abort registration command to the CDMA controller 36 and sets enable_regn_rpt to true.

The CDMA controller 36 is caused to disable the power-up timer if it is enabled. If the power-up timer has already expired, then power-down registration is performed as shown in FIG. 9. If the power-down registration process needs to be performed, then the CDMA controller 36 starts a power-down by sending a power-down registration message to the CDMA network 40. The CDMA network 40 sends an acknowledgement to the CDMA controller 36 and the CDMA controller 36 returns a registration status message to the DMC 30 as to whether the de-registration process was a success or a failure. Thereafter, or if the power-up timer was successfully disabled, the flagging module 180 sets the enable_regn and enable_regn_rpt flags to false.

Figure 12:
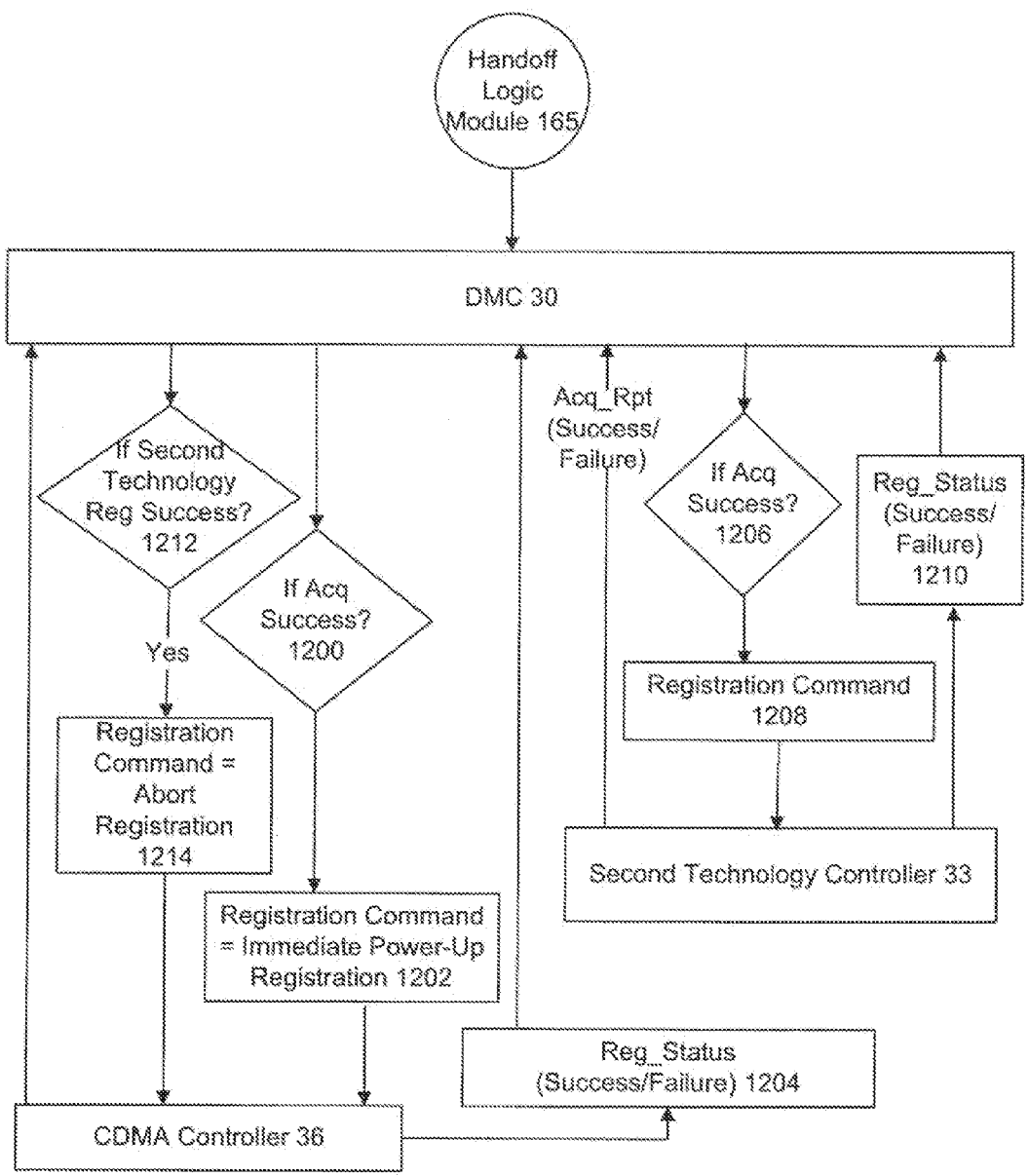
FIG. 12 is a flowchart illustrating an abort registration process according to an embodiment of the present invention.

FIG. 12 is a flowchart illustrating an abort registration process according to an embodiment of the present invention. The process of FIG. 12 occurs when the CDMA network is acquired but the handset is not yet registered (e.g., the power-up timer has not expired) and the second technology network is acquired and the handset logic module 165 determines that the handset should register with the second technology network 60.

In this scenario, the CDMA controller 36 attempts to acquire the CDMA network 40 and at step 1200, the DMC 30 ensures that the handset 20 has acquired the CDMA network 40 and issues an immediate power-up registration command at step 1202. The CDMA controller 36 reports the registration status to the DMC 30 at step 1204. Thereafter, the DMC 30 determines if the handset 20 has acquired the second technology network 60 at step 1206. If so, the DMC 30 sends a registration command to the second technology controller 33 at step 1208 and the second technology controller 33 reports the registration status to the DMC 30 at step 1210.

Immediately thereafter, and before the power-up timer expires in the CDMA registration process, the DMC 30 determines at step 1212 whether the registration on the second technology network 60 was a success. If so, then at step 1214 the DMC 30 issues an abort registration command to the CDMA controller 36 and the process returns to step 1204 where the CDMA controller 36 reports the registration status to the DMC 30.

Figure 13:
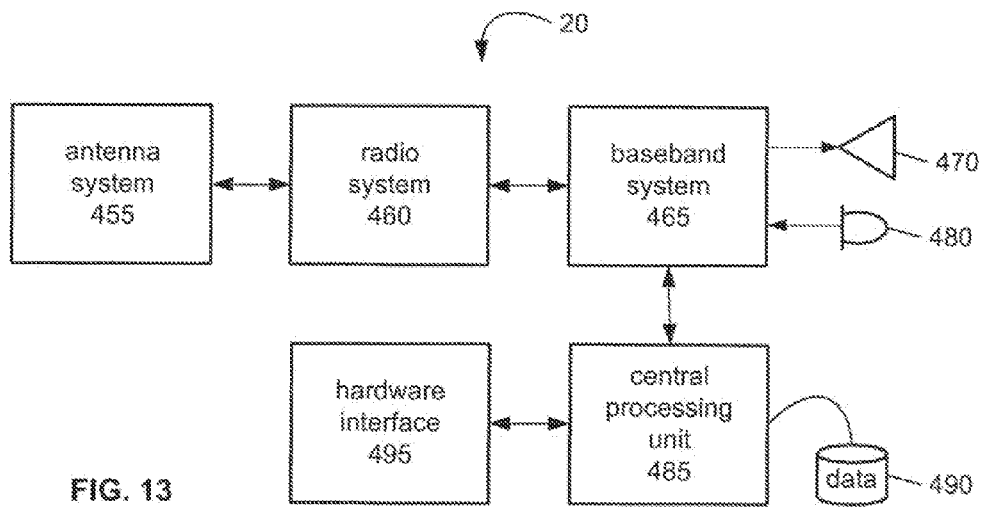
FIG. 13 is a block diagram illustrating an example wireless communication device that may be used in connection with various embodiments described herein.

FIG. 13 is a block diagram illustrating an example handset 20 that may be used in connection with various embodiments described herein. For example, the handset 20 may be used in conjunction with a DMC 30 that can control registration and de-registration from at least a CDMA network and a network that uses a second technology. However, other handsets and/or architectures may also be used, as will be clear to those skilled in the art.

In the illustrated embodiment, handset 20 comprises an antenna system 455, a radio system 460, a baseband system 465, a speaker 470, a microphone 480, a central processing unit ("CPU") 485, a data storage area 490, and a hardware interface 495. In the handset 20, radio frequency ("RF") signals are transmitted and received over the air by the antenna system 455 under the management of the radio system 460.

In one embodiment, the antenna system 455 may comprise one or more antennae and one or more multiplexers (not shown) that perform a switching function to provide the antenna system 455 with transmit and receive signal paths. In the receive path, received RF signals can be coupled from a multiplexer to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The. baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the handset 20 to perform the various functions of the present invention as previously described. For example, data storage area 490 may include various software modules (not shown) that were previously described with respect to FIG. 2.

In this description, the term "computer readable medium" is used to refer to any media used to provide executable instructions (e.g., software and computer programs) to the handset 20 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the handset 20. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 14:
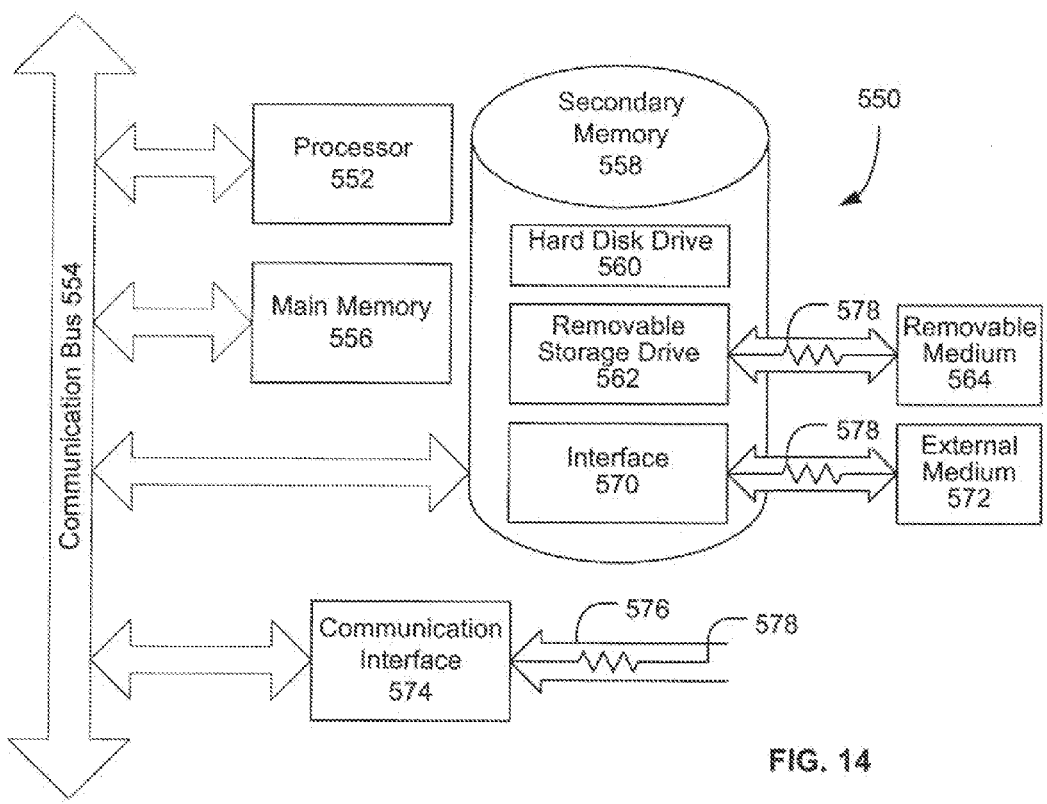
FIG. 14 is a block diagram illustrating an example computer system that may be used in connection with various embodiments described herein.

FIG. 14 is a block diagram illustrating an example computer system 550 that may be used in connection with various embodiments described herein. For example, the computer system 550 may be used in conjunction with the CDMA network 40, the second technology network 60, and the handset 20. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for performing a handoff between a first technology network and a second technology network, the method comprising, by a wireless communication device:
   acquiring a first technology network;
   sending a power-up registration command from a dual mode controller (DMC) to a first technology controller;
   after acquiring the first technology network and after sending the power-up registration command to the first technology controller, switching a registration flag to a first state which enables registration with the first technology network;
   in response to receipt of the power-up registration command by the first technology controller, starting a power-up timer;
   if a second technology network is acquired prior to expiration of the power-up timer, registering with the second technology network, aborting registration with the first technology network, and switching the registration flag to a second state which disables registration with the first technology network; and,
   if the second technology network is not acquired prior to expiration of the power-up timer, registering with the first technology network.

2. The method of claim 1, further comprising determining a handoff should occur based on one or more of a signal strength, a signal to noise ratio, a quality of service, a dropped packet, a battery use among technologies, and a preference settings.

3. The method of claim 1, further comprising:
   after registration with the second technology network, detecting an indication that a handoff to the first technology network should be performed; and
   after detection of the indication, sending an immediate power-up registration command from the DMC to the first technology controller, switching the registration flag to the first state, and performing a handoff to the first technology network.

4. The method of claim 3, further comprising:
   after the handoff to the first technology network, detecting an indication that a handoff to the second technology network should be performed; and,
   after detection of the indication that a handoff to the second technology network should be performed, sending a power-down registration command from the DMC to the first technology controller, de-registering from the first technology network, and switching the registration flag to the second state after de-registration from the first technology network.

5. The method of claim 4, further comprising:
   after receipt of the power-down registration command, switching a registration report flag to a first report state which indicates that a registration status message should be returned from the first technology controller to the DMC; and,
   after de-registration from the first technology network, switching the registration report flag to a second report state which indicates that a registration status message should not be returned from the first technology controller to the DMC.

6. The method of claim 1, further comprising switching the registration flag to the second state before the step of sending the power-up registration command.

7. A wireless communication handset device comprising:
   a first technology controller configured to establish a communicative coupling to a first technology network using a first technology radio;
   a WiFi controller configured to establish a communicative coupling to a WiFi network using a WiFi radio;
   a dual mode controller (DMC) configured to control the first technology controller and the second technology controller and to receive responses from the first technology controller and the WiFi controller;
   a flagging module configured to switch a flag; and
   a handoff logic module configured to determine whether the DMC should instruct the first technology controller or the WiFi controller to complete the communicative coupling with the first technology network or the WiFi network or to break the communicative coupling with the first technology network or the WiFi network;
   wherein the DMC is configured to send a power-up registration command to the first technology controller in response to the handoff logic module,
   wherein the flagging module is configured to switch registration report flag in response to the handoff logic module,
   wherein, after the acquisition of the first technology network and after the sending of the power-up registration command to the first technology controller, switching the registration report flag to a first report state which indicates that a registration status message should be returned from the first technology controller to the DMC,
   wherein, in response to receipt of the power-up registration command by the first technology controller, the first technology controller starts a power-up timer,
   wherein, if a second technology network is acquired prior to expiration of the power-up timer, the DMC initiates registration with the second technology network, the first technology controller aborts registration with the first technology network, and the flagging module switches the registration report flag to a second report state which indicates that a registration status message should not be returned from the first technology controller to the DMC, and
   wherein, if the second technology network is not acquired prior to expiration of the power-up timer, the first technology controller registers with the first technology network.

8. The system of claim 7 wherein, after registration with the second technology network, the handoff logic module determines that a handoff to the first technology network should be performed, and, in response to the determination, the DMC is configured to send an immediate power-up registration command to the first technology controller, the flagging module is configured to switch the registration report flag to the first report state, and the DMC is configured to initiate a handoff to the first technology network.

9. The system of claim 8 wherein, after the handoff to the first technology network, the handoff logic module determines that a handoff to the second technology network should be performed, and, in response to the determination, the DMC is configured to send a power-down registration command to the first technology controller, the first technology controller is configured to de-register from the first technology network, and the flagging module is configured to switch the registration report flag to the second report state.

10. The system of claim 7 wherein, after registration on the first technology network, the first technology controller is configured to switch the registration report flag to the second report state.

11. A multi-technology handset comprising:
   a first technology controller communicatively coupled with a non-transitory computer readable medium;
   a second technology controller communicatively coupled with the non-transitory computer readable medium;
   a dual mode controller communicatively coupled with the non-transitory computer readable medium;
   wherein the first technology controller, the second technology controller, and the dual mode controller are configured to facilitate registration with a CDMA network and a second technology network by:
      acquiring a first technology network,
      sending a power-up registration command from the dual mode controller to the first technology controller,
      after acquiring the first technology network and after sending the power-up registration command to the first technology controller, switching a registration flag to a first state which enables registration with the CDMA network,
      in response to receipt of the power-up registration command by the CDMA controller, stating a power-up timer,
      if a second technology network is acquired prior to expiration of the power-up timer, registering with the second technology network, aborting registration with the first technology network, and switching the registration flag to a second state which disables registration with the CDMA network; and,
      if the second technology network is not acquired prior to expiration of the power-up timer, registering with the first technology network.

12. The handset of claim 11 wherein the first technology controller, the second technology controller, and the dual mode controller are further configured to facilitate registration with a CDMA network and a second technology network by:
   after registration with the second technology network, detecting an indication that a handoff to the CDMA network should be performed; and,
   after detection of the indication, sending an immediate power-up registration command from the dual mode controller to the first technology controller, switching the registration flag to the first state, and performing a handoff to the CDMA network.

13. The handset of claim 12 wherein the first technology controller, the second technology controller, and the dual mode controller are further configured to facilitate registration with a CDMA network and a second technology network by:
   after receipt of the immediate power-up registration command, switching a registration report flag to a first report state which indicates that a registration status message should be returned from the first technology controller to the DMC; and,
   after registration on the CDMA network, switching the registration report flag to a second report state which indicates that a registration status message should not be returned from the first technology controller to the DMC.

14. The handset of claim 11 wherein the first technology controller, the second technology controller, and the dual mode controller are further configured to facilitate registration with a CDMA network and a second technology network by:
   after the handoff to the CDMA network, detecting an indication that a handoff to the second technology network should be performed; and,
   after detection of the indication that a handoff to the second technology network should be performed, sending a power-down registration command from the DMC to the first technology controller, de-registering from the CDMA network, and switching the registration flag to the second state after de-registration from the CDMA network.

15. The handset of claim 14 wherein the first technology controller, the second technology controller, and the dual mode controller are further configured to facilitate registration with a CDMA network and a second technology network by:
   after receipt of the power-down registration command, switching a registration report flag to a first report state which indicates that a registration status message should be returned from the first technology controller to the DMC; and,
   after de-registration from the CDMA network, switching the registration report flag to a second report state which indicates that a registration status message should not be returned from the first technology controller to the DMC.

* * * * *